United States Patent [19]

Verbaas

[11] 3,786,496

[45] Jan. 15, 1974

[54] KEY PAD CONTROL ARRANGEMENT

[75] Inventor: George Verbaas, Brockville, Ontario, Canada

[73] Assignee: GTE Automatic Electric Laboratorie Incorporated, Northlake, Ill.

[22] Filed: July 25, 1972

[21] Appl. No.: 275,023

[52] U.S. Cl. .............................. 340/365 S, 179/90 K

[51] Int. Cl. .............................. G08c 1/00

[58] Field of Search .................. 340/365 S, 347 DD, 340/365 R; 179/90 K, 99

[56] References Cited

UNITED STATES PATENTS

| | | | |
|---|---|---|---|
| 2,665,336 | 1/1954 | Saykay | 340/365 S |
| 3,676,615 | 7/1972 | Wiedmer | 340/365 R |
| 3,457,368 | 7/1969 | Houcke | 340/365 S |
| 3,538,256 | 10/1970 | Lucas | 340/365 S |

*Primary Examiner*—Kathleen H. Claffy
*Assistant Examiner*—Mitchell Saffian
*Attorney*—K. Mullerheim et al.

[57] ABSTRACT

An arrangement for selectively connecting a control potential, such as ground, to one out of *n* outputs, or preferably to a group of 1-or-2-out-of-4 coded output terminals, by means of a keypad of present-day vintage, which has two sets of control contacts, one set respectively linked to the columns of the keys and the other to the rows of the keys. The arrangement requires a minimum number of conversion relays and permits mounting of the conversion equipment on a printed circuit card affixed to the bottom of the keypad.

6 Claims, 7 Drawing Figures

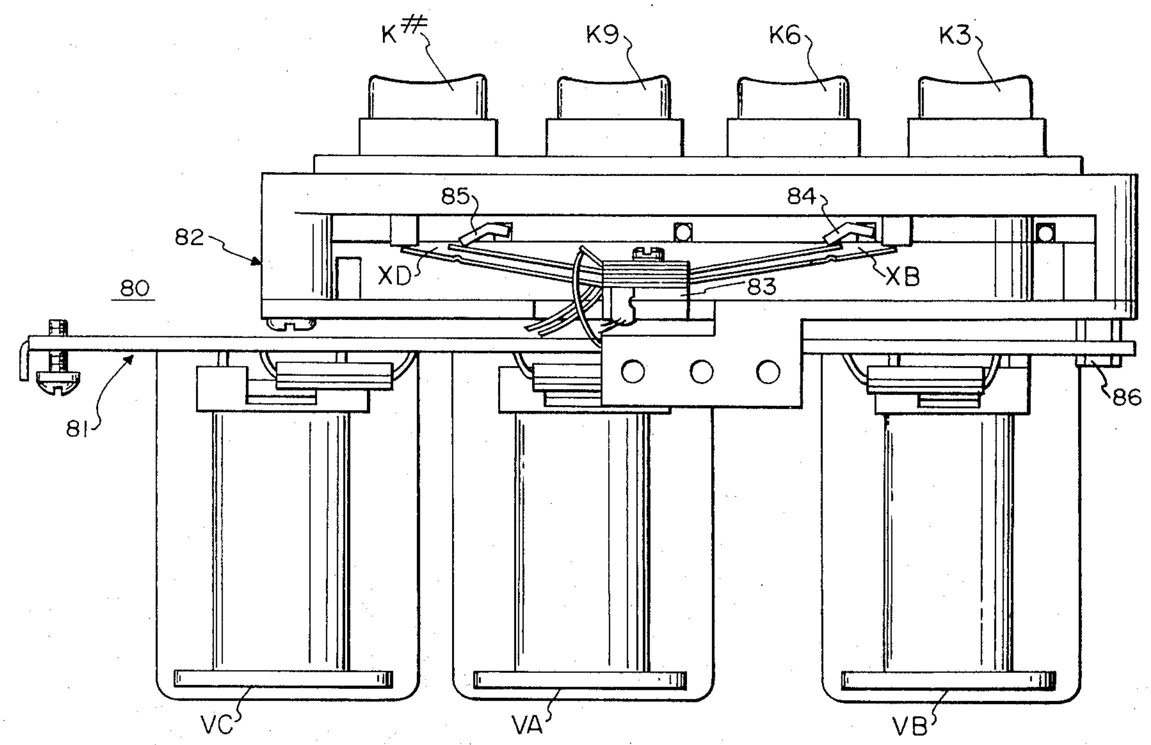
FIG. 3
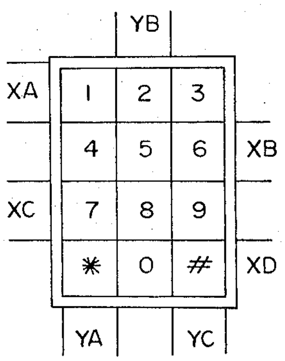
FIG. 4
| DIGIT | KEY PAD CONTACTS | TRANSLATION |
|---|---|---|
| 1 | XA+YA | A |
| 2 | XA+YB | B |
| 3 | XA+YC | C |
| 4 | XB+YA | D |
| 5 | XB+YB | AB |
| 6 | XB+YC | AC |
| 7 | XC+YA | AD |
| 8 | XC+YB | BC |
| 9 | XC+YC | BD |
| 0 | XD+YB | CD |
FIG. 5

KEY PAD CONTROL ARRANGEMENT

BACKGROUND OF THE INVENTION

1. Field of the Invention

This invention relates to arrangements for controlling switching, or the like, apparatus by means of a coordinate array of pushbuttons or keys, referred to herein as a keypad. Although the arrangement according to the invention has been devised primarily with its use in building entrance control systems in mind, the arrangement is also applicable to other environments which require the selective transmission of control signals. Thus the invention may be applied for instance to the transmission of such signals from the turret or attendant's cabinet of a PABX (private automatic branch exchange) to the switching equipment of this telephone system.

2. Description of the Prior Art

An example of a building entrance control — and intercommunication — system will be found in U.S. Pat. No. 3,484,561 to J. T. Matthews, issued on Dec. 16, 1969 and assigned to the present assignee.

The control arrangement of that system uses individual pushbuttons, mounted on panels at each entrance of the building along the directory panels, for the selection of the desired apartment by a visitor in the lobby. However, while the arrangement shown in the Matthews patent in all other respects is entirely satisfactory, a shortcoming of this arrangement resides in the amount of cabling required between the building lobby and the common switching equipment, which latter equipment is usually located in the basement of the building. It is clear that in the system shown in the patent there have to be at least as many selecting conductors from the foyer to the common switching equipment, as there are apartments, and in larger buildings the number of apartments may be fairly high. Moreover the numerous panels on which these pushbutton panels are mounted take up an increasing amount of wall space the larger the size of the apartment building; this is not only esthetically undesirable but it also requires the visitor to search for and depress a particular one of a multitude of numbered pushbuttons.

In U.S. Pat. No. 3,557,318 to J. J. Buonsante, issued Jan. 19, 1971, an apartment house telephone and entrance control system has been disclosed which is similar to the system of the Matthews patent in many respects. In the system disclosed by Buonsante the use of individual pushbuttons per apartment is avoided by reverting to a multifrequency signaling arrangement requiring a multifrequency ("Touch Tone" or "Touch Calling") keypad unit at the transmitting end, that is in the lobby, and a multifrequency receiver at the switching equipment end. While this arrangement is not subject to the drawbacks mentioned above this advantage is offset by the high cost and the complexity of the multifrequency signalling equipment involved which make the use of this technique uneconomical for local distances such as, for instance, between the ground floor and the basement of a building.

OBJECTS AND SUMMARY OF THE INVENTION

It is, therefore, an object of the invention to provide a keypad control arrangement which takes advantage of the keypads proper, such as used in "Touch Calling" systems, — whose contacts are provided in two sets, one set for each row of keys and the other for each column of keys, and which, in response to the depression of one of the keys, are actuated on a 1-out-of-$x$ plus 1-out-of-$y$ basis — but which at the same time obviates the use of multifrequency sending or receiving equipment.

With the foregoing and other objects in mind the invention, briefly, provides for circuitry by means of which the 1-out-of-$x$ plus 1-out-of-$y$ output of a keypad is converted to a decimal or, preferably, a substantially binary output.

It might be thought that such a conversion arrangement requires as many relays as there are keypad contacts, that is, seven relays in the case of a 4×3 keypad ($x$=4, $y$=3, thus $x$+$y$=7). However, applicant has discovered that by means of a unique approach it is possible in the assumed example to reduce the number of relays required for the conversion to three or even two. In accordance with this aspect of the invention one of the two coordinate sets of contacts of the keypad, for example, the column contacts, are connected to control a corresponding number of relays, for example, three — or a lesser number, two — while the control potential, say ground, is connected through the contacts of the other set of keypad contacts, a tree-type array of contacts of the aforementioned relays, and, if required, feedback preventing rectifying means in series to the output leads, thereby to selectively activate these leads. Preferably, this "buffer" circuitry is mounted on a printed circuit card which, in turn, is secured to the bottom of the keypad.

As is well-known, in the "Touch Calling" type of keypads as widely used today for DMTF (dual tone multifrequency) dialing in telephone systems, the keys or pushbuttons are typically arranged in a coordinate array, usually with three keys in each row and four keys in each column. At one or the other end of each of these rows and columns an electrical contact is accessibly provided along the periphery of the keypad and these contacts are mechanically linked to the keys, for instance by cam shafts, in such a way that upon actuation of any one of these keys both the contact associated with the corresponding column and the contact associated with the corresponding row, and in addition a common contact, are actuated. The DTMF keypads or dials of this general kind typically carry on their underside a printed circuit card on which the electrical components of the DTMF oscillator are mounted. The tank circuits of this oscillator are selectively closed by the selective operation of the contacts just referred to so that in response to the actuation of one of the pushbuttons the corresponding one out of three low voice frequencies and simultaneously the corresponding one out of four high voice frequencies are transmitted over the subscriber line to the Touch Calling receiver in the switching equipment. The oscillator itself is started by the above-mentioned common contacts.

In the keypad unit according to the embodiment of the present invention as described hereinafter the oscillator card is not required and, instead, there is mounted on the bottom side of the keypad a printed circuit card carrying the circuitry which serves to convert the 1-out-of-$x$ plus 1-out-of-$y$ outputs obtained from the above-mentioned row and column contacts of the keypad to a preferably binary form. More particularly, in the D.C. controlled receiving equipment into which the keypad circuit of the invention is designed to operate, the keyed digits are stored in 1-or-2-out-of-4, or "codel," form. This notation is essentially a four-bit binary code in which only those combinations containing a single 1 or two 1's are used. With this "codel" type of code, therefore, only 10 different signals — rather than the 15 or 16 which would be provided by a complete four-bit binary code — can be handled, but then no more than ten different signals are required in decimal control systems of this kind and only four conductors are needed for the selective transmission of these signals in "codel" form.

With respect to details of the overall system and, especially, particulars of the receiving equipment which is operated by the selective application, at the transmitting or controlling end, of an electrical potential such as ground to one or two out of four control conductors, digit after digit, reference is made to copending U.S. Pat. application Ser. No. 275,016 for a Building Entrance Control System with Keypad Control, filed by W. Forrest under even date. In this copending application which is assigned to the present assignee, a preferred 1-or-2-out-of-4 type receiving arrangement for such a system has been described and claimed.

BRIEF DESCRIPTION OF THE DRAWINGS

The invention will be best understood by reference to the accompaning drawings in which two preferred embodiments have been illustrated by way of example. In the drawings:

FIG 3 is a sideview of the overall assembly of a preferred physical embodiment of the invention wherein a printed circuit card carrying the electrical components of the buffer circuit is secured to the underside of the keypad proper;

FIG. 4 illustrates in schematic form the association of the two sets of keypad contacts with the rows and columns, respectively, of the keys; it thus supplements, diagrammatically, the showing of FIG. 2; and FIG. 5 is a translation table showing the combinations of operated keypad contacts as well as the translated outputs on the four output terminals of the keypad control arrangement for each of the digits keyed.

DESCRIPTION OF PREFERRED EMBODIMENTS

Figure 1:
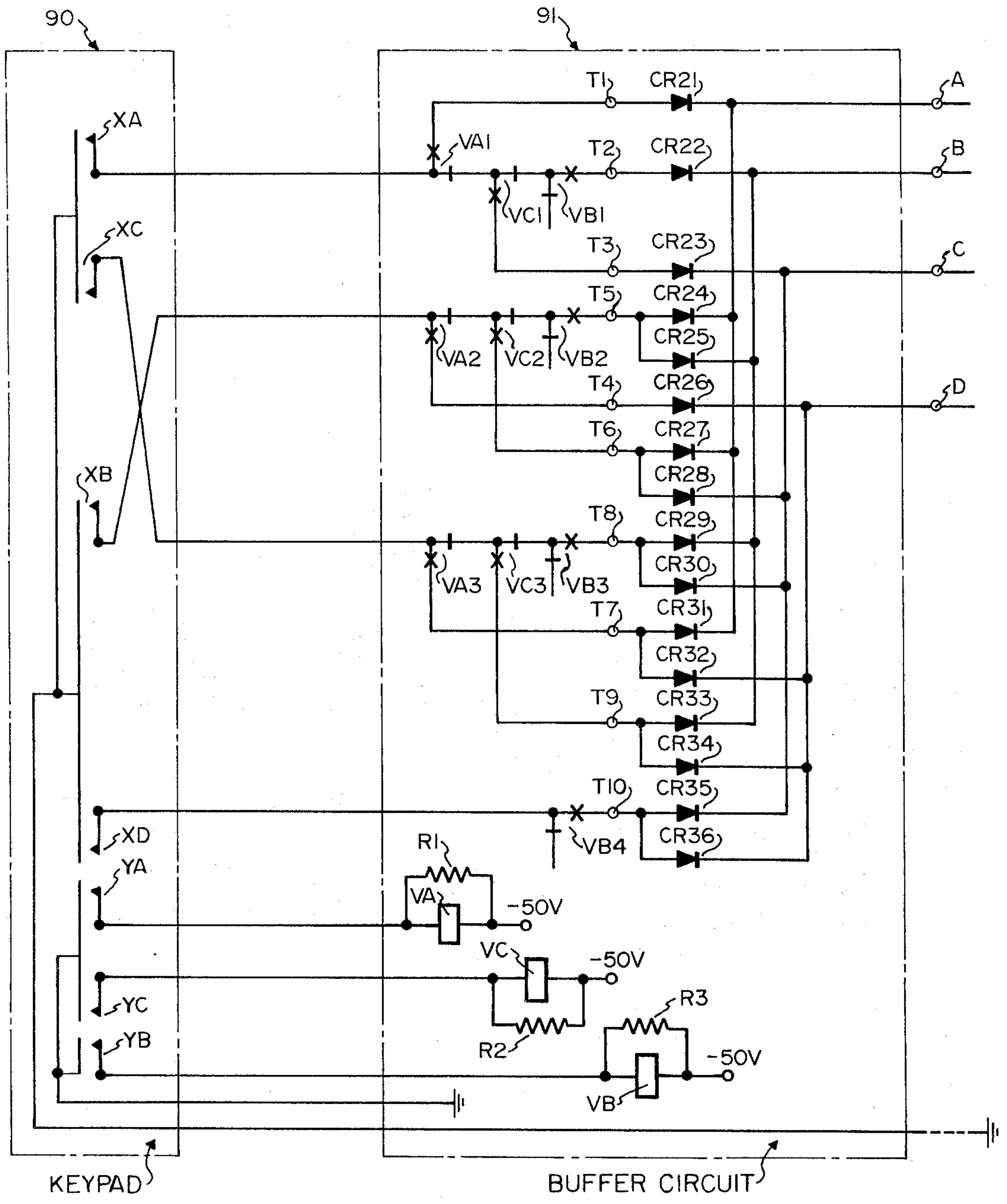
FIG. 1 is a circuit schematic of the keypad control arrangement of the invention. The figure shows the two sets of keypad contacts, the four output terminals and a three-relay buffer circuit interposed therebetween.

Referring first to the circuit schematic of FIG. 1 there are shown on the left-hand side of this figure the two sets of keypad contacts, namely the set of four horizontal or row contacts XA, XB, XC and XD and the set of three column or vertical contacts YA, YB AND YC. All of these contacts are of the normally open or "make" type — and preferably of the twin-contact type — and each of them is in the normal condition of the circuit connected to ground.

On the right side of FIG. 1 there is shown the buffer circuit comprising three conversion relays VA, VB and VC and their associated shunt resistances R1, R2 and R3, and also a set of 16 diodes CR21 to CR36. The right-hand terminals of the windings of all three relays, as viewed in FIG. 1, are connected to the negative side of the 50 volt system battery. As shown in the figure, each of the three relays VA, VB, VC is serially connected to, and controlled by, the corresponding vertical keypad contact YA, YB, YC. Each of the relays has a number of break-make contacts designated VA1 to VA3, VB1 to VB4 and VC1 to VC3 and these contacts are connected to each other, generally speaking, in relay tree fashion. More particularly, contacts VA1, VC1 and VB1 form an individual tree configuration which is connected at its input end to horizontal keypad contact XA and at its output end to circuit points T1, T2, T3; relay contacts VA2, VC2 and VB2 form another individual tree configuration which is connected at its input end to horizontal keypad contact XC and at its output end to circuit points T4, T5 and T6; relay contacts VA3, VC3 and VB3 form another tree configuration which is connected at its input end to horizontal keypad contact XB and at its output end to circuit points T7, T8 and T9. In addition, the make portion of relay contact VB4 is connected on one side to horizontal keypad contact XD and on the other side to circuit point T10. It may be added that although all relays in FIG. 1 have been assumed to be provided with break-make combinations throughout, it will be clear that the various unused portions of some of these contacts could be omitted. This applies correspondingly to FIG. 1*a* which will be described hereinbelow.

As will become clearer yet from the description of the two examples given hereinafter of the operation of the circuit. the result of this overall contact arrangement is that, in response to the depression of any of the pushbuttons of the keypad, only the correspondingly numbered one of the 10 circuit points T1 to T10, FIG. 1, will be connected to ground. In this fashion then 1-out-of-*n* selection is provided by the keypad in connection with the conversion relays.

Figure 2:
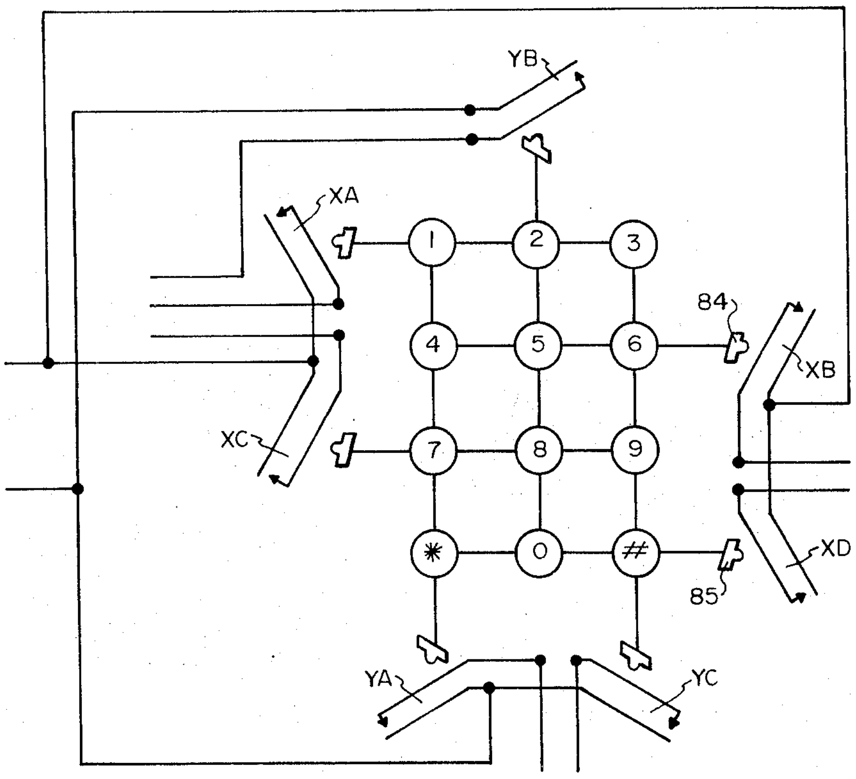
FIG. 2 PRIOR ART
FIG. 2, labeled "Prior Art," shows in simplified form the physical layout of a keypad of existing design.

Reference is made at this point to FIGS. 4, 5 and 2. In FIG. 4 the association of the two sets of contacts XA, XB, XC, XD and YA, YB, YC, FIG. 1, with the corresponding rows and columns respectively of the keypad has been singled out and represented in diagrammatic fashion. Similarly, in the first two columns of FIG. 5 the pairs of keypad contacts are tabulated which are operated in response to the depression of the ten digit keys respectively. As will be noted from FIGS. 4 and 5, the pushbuttons shown to the left and to the right of the 0 pushbutton are not used since they are not required for the digital control of the present embodiment. In FIG. 2 there is shown in simplified form the physical layout of the general type of keypad, well known in the art, the use of which is contemplated herein. For convenience in reference, the same reference designations have been used in this "Prior Art" figure as those used in the remaining figures. FIG. 2 illustrates, in particular, the physical disposition of the horizontal set of contacts, XA, XB, XC, XD and the vertical set of contacts YA, YB, YC along the four edges of the keypad. The figure also illustrates how these 3+4=7 contacts are mechanically linked — in a manner merely schematically indicated — by cross-coordinate cam shafts ending in contact-activating cams 84, 85, for example.

Reverting again to FIG. 1, the sixteen diodes CR21 through CR36 are interposed in a forward direction between circuit points T1 to T10 and the "codel" output terminals A, B, C, D — and the output conductors connected thereto — in such a way that the 1-out-of-*n* ground marking appearing in the manner described above on circuit points T1 to T10 is converted into 1-or-2-out-of-4 markings on the four "codel" output conductors. These output conductors — not particularly designated in FIG. 1 — lead to corresponding inputs of the digit storage apparatus of the system which is to be controlled by the ground markings selectively applied, digit-by-digit, to terminals A, B, C, D, FIG. 1. As indicated above, a system with corresponding inputs is disclosed and claimed in the aforementioned patent application of W. Forrest on a Building Entrance Control System with Keypad Control, which is simultaneously filed herewith. The receiving or storage circuitry of the system according to this co-pending application has been illustrated in simplified form in FIG. 6 which will be briefly described hereinafter.

More specifically it will be noted that circuit points T1, T2, T3 and T4 FIG. 1 each are connected to the left-hand side of only one diode, namely CR21, CR22, CR23 and CR26 respectively, so that in response to the depression of pushbuttons 1, 2, 3, 4 only one of the output conductors A, B, C, D, respectively, has the ground marking applied thereto. On the other hand circuit points T5 to T10 are each connected to a pair of the remaining diodes so that, in view of the multiple connections on the righthand side of the diodes, the depression of any of the pushbuttons 5 to 10 brings about the simultaneous ground-marking, in the pattern shown in the third column of FIG. 5, of two of the four output conductors A, B, C, D. It will also be clear from an inspection of FIG. 1 that the diodes have a feedback preventing function, i.e., they insure that in spite of the aforementioned multiple connections only the desired output conductor or conductors, and none of the others, are energized with ground.

In the operation of the arrangement of FIG. 1, assuming by way of example that pushbutton 1 has been depressed and that accordingly keypad contacts XA and YA have been actuated, conversion relay VA will be operated in a circuit extending from ground through vertical contact YA, winding of relay VA to battery; and as a result ground is connected to output terminal A, viz. through horizontal conductor XA, the make portion of contact VA1 of relay VA, circuit point T1 and diode CR21. Since neither of the other two relays VB or VC is operated and none of the other three horizontal contacts actuated no other output terminals are marked with ground.

To take another example, assuming pushbutton 5 is depressed and accordingly keypad contacts XB and YB are actuated, it will be appreciated that relay VB will operate over a circuit extending from ground via vertical contact YB and the winding of relay VB to battery; and that accordingly ground marking of both output conductors A and B is effected, namely over the following circuit paths; ground, horizontal keypad contact XB, the break portions of contacts VA2 and VC2, the make portion of contact VB2, circuit point T5, and hence via diode CR24 to output terminal A, and, via diode CR25 to output terminal B. It may be mentioned at this point that the shunt resistances R1, R2 and R3 which are connected in parallel with the windings of relays VA, VC, VB, respectively, are provided for spark protection and that they also render these conversion relays slightly slow-to-release.

Figure 1A:
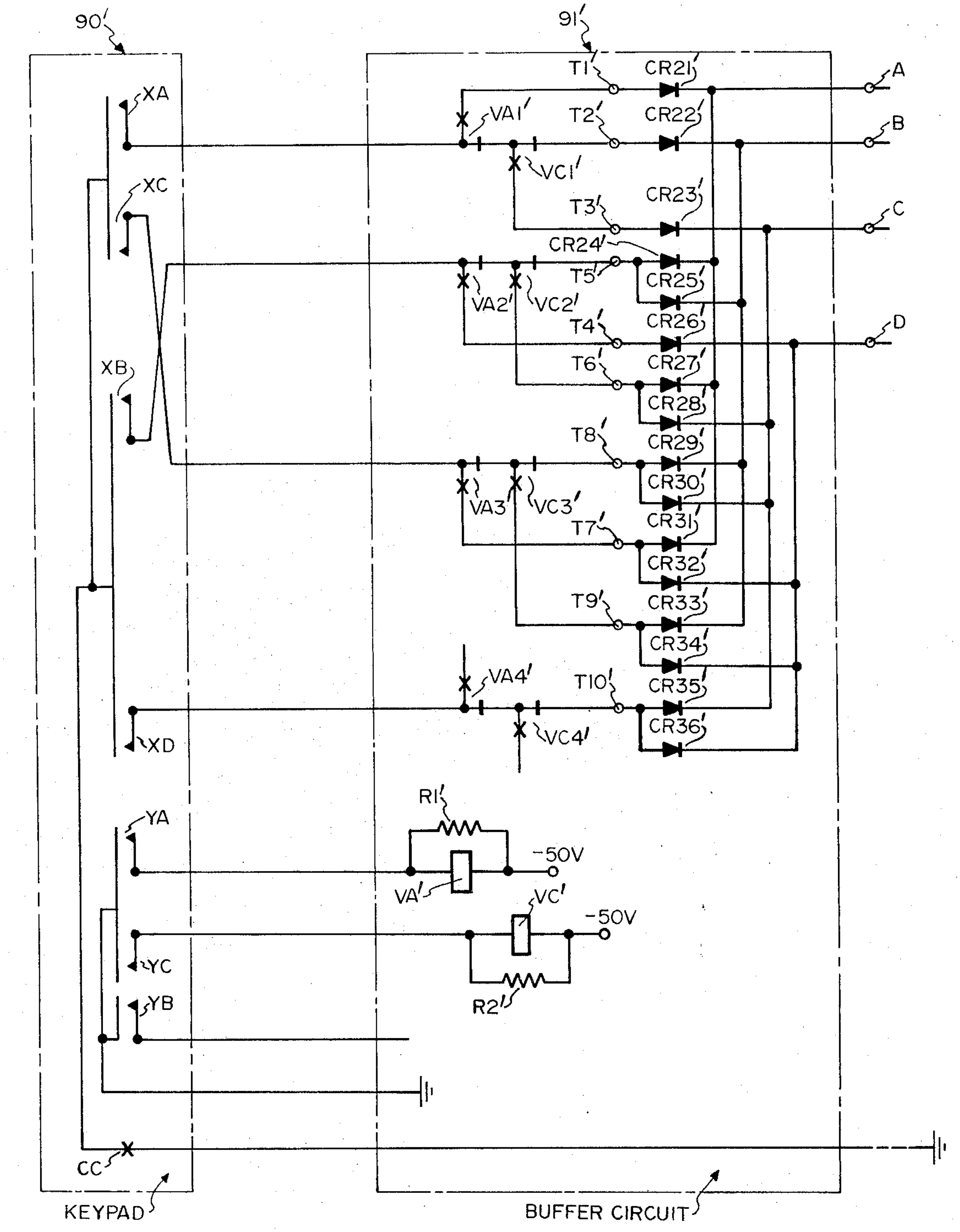
FIG. 1*a* is a circuit schematic of a modified keypad control arrangement according to the invention. This modified schematic is similar to that shown in FIG. 1 except that the buffer circuit in this case comprises only two relays instead of three and that use is made of the common contact of the keypad.

Turning now to FIG. 1*a*, the modified keypad control circuit illustrated in this figure in many respects is similar to that shown in FIG. 1, and accordingly corresponding circuit elements in FIG. 1*a* have been represented by the same reference numerals as the respective ones in FIG. 1 except with a "prime" added thereto. It will be noted that in the modified circuit of FIG. 1a one of the three conversion relays, VB, has been omitted and that, on the other hand, use is made of the common contact CC of the keypad which is actuated, in a manner well known in the art, upon depression of any of the keys. In FIG. 1*a* this common contact CC has been interposed in series with each of horizontal contacts XA, XB, XC and XD in order to obviate timing difficulties that might otherwise arise from the fact that some of the ground marking paths, namely those leading to circuit points T2′, T5′, T8′ and T10′ contain only break contacts of the conversion relays; thus, in the absence of common contact CC, the marking ground would appear on all of these circuit points immediately upon closure of the corresponding horizontal contacts XA, XB, XC or XD, and this would occur before relay VA′ or VC′ would have had time to operate and, at its corresponding break contacts, open the undesired ones of these circuit paths. The common contact CC is a "last-to-operate" contact with respect to all of the other keypad contacts and this will give relay VA′ or VC′, as the case may be, enough time to operate before any of the storage relays, FIG. 6, connected to the output terminals A, B, C, D had been able to operate over one of the aforementioned undesired paths. In addition, the last-mentioned storage relays could be made — or chosen to be — slightly slower to operate than the conversion relays VA′ and VC′.

Reference finally is made to FIG. 3 which represents a side view of the overall assembly 80 of the preferred physical embodiment of the invention disclosed herein. As will be seen from FIG. 3, conversion relays VA, VB, VC, together with the remaining components of the buffer circuit 91, FIG. 1, are mounted on a printed circuit card 81 which, at 86, in turn is secured to the bottom of the keypad 82 proper in a plane parallel thereto; the keypad corresponds in overall design to that schematically shown in FIG. 2. Relays VA, VB and VC are miniature relays (of the HQA type in the present example).

Figure 6:
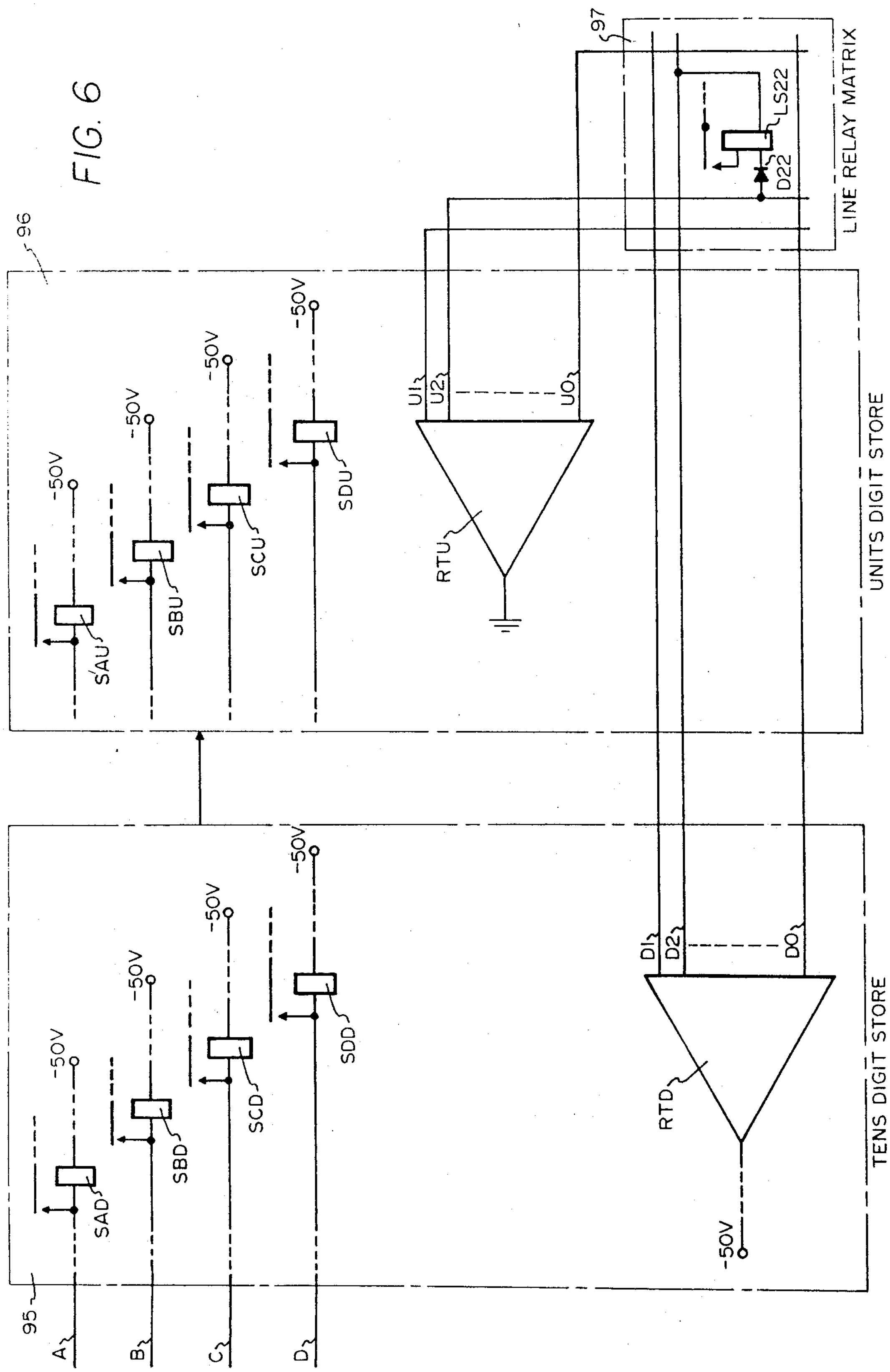
FIG. 6 illustrates, by way of example and in diagrammatic form receiving circuitry which may be used in conjunction with the present control arrangement; this circuitry corresponds to that disclosed and claimed in the above-mentioned patent application of W. Forrest.

As mentioned above, FIG. 6 illustrates in simplified form receiving circuitry which may be used with the keypad control arrangement of the present invention and which has been disclosed in greater detail in the aforementioned co-pending patent application of W. Forrest. In FIG. 6 it has been assumed that the system is a 100 line system. Accordingly the figure shows a tens digit store 95 having four storage relays SAD, SBD, SCD, SDD connected to the four "codel" conductors A, B, C, D, respectively, these conductors being controlled from the correspondingly designated terminals on the right-hand side of FIG. 1 or FIG. 1*a;* a units digit store 96 comprising four units storage relays SAU, SBU, SCU and SDU; and a line relay matrix 97 including 100 line relays LS and their associated backfeed preventing diodes.

As will be noted from FIG. 6, the first or tens digit keyed on keypad 90, FIG. 1, or 90', FIG. 1*a*, is directly received and stored in "codel" or 1-or2-out-of-4 form by the relays of the tens digit store. After these relays have operated and ground has been removed from the "codel" conductors upon release of the key first depressed, conductors, A, B, C, D, in a manner not particularly shown in FIG. 6, are transferred to the relays of the units digit store so that these latter relays are now operated in a "codel" combination corresponding to the second digit keyed on the transmitting keypad. As indicated in FIG. 6, the actuated storage relays of both stores are held in respective locking circuits closed upon operation of the corresponding relays. Apart from these locking contacts no contacts of the digit storage relays have been specifically shown in FIG. 6. However, as diagrammatically indicated in the figure, additional contacts of tens relays SAD to SDD are connected so as to form a relay contact tree RTD which at its input end is terminated in negative battery. Likewise, additional contacts of units storage relays SAU to SDU are connected to form a relay contact tree RTU which at its input end is connected to ground. As shown in FIG. 6, relay contact tree RTD at its output end has ten tens conductors D1, D2 to D0 connected thereto; similarly the output of relay contact tree RTU is connected to ten units conductors U1, U2 to U0. As will be seen moreover from FIG. 6, the last mentioned tens conductors form the horizontal inputs to line relay matrix 97 and units conductors U1 to U0 form the vertical conductors of this matrix.

From the foregoing it will be seen that in response to two successive key depressions, for the first digit and second digit respectively, at keypad 90 or 90', one of the 100 line relays of the line relay matrix is uniquely selected. Assuming for instance that both the first digit and the second digit set up by means of the keypad is a 2 then this operation will result in the selection of line relay LS22, FIG. 6. More particularly the operating circuit of line relay LS22 extends from ground at the input of relay contact tree RTU via conductor U2, feedback preventing diode D22, lower winding of line relay LS22, conductor D2, relay contact tree RTD, to negative battery. Relay LS22, upon operation, locks as indicated over the upper winding.

It is to be understood that while the present invention has been shown and described with reference to the preferred embodiments thereof, the invention is not limited to the precise forms set forth, and that various modifications and changes may be made therein without departing from the spirit and scope of the present invention.

What is claimed is:

1. An arrangement for selecting 1-out-of-*n* circuits by means of a keypad having n keys, said keypad being of the type having a first-coordinate set of control contacts each operatively linked to a first-coordinate set of keys and a second-coordinate set of control contacts each operatively linked to a second-coordinate set of keys of said keypad so that, upon depression of one of the keys, both the respective first-coordinate control contact and the respective second-coordinate control contact are operated, said arrangement comprising a plurality of relay means each having a number of contact means and having an operating winding connected to a respective one of said first-coordinate control contacts so as to be controlled thereby, said contact means being connected in a pattern of tree-type structure, with the inputs of said pattern respectively connected to said second-coordinate set of control contacts and the outputs of said pattern respectively, providing said n circuits.

2. An arrangement as claimed in claim 1, wherein as many relay means are provided as there are first-coordinate control contacts, with the winding of each said relay means connected to the respective one of said contacts, and wherein said pattern comprises a plurality of individual relay-contact trees, each said contact tree including normally open and normally closed contacts of said relays.

3. An arrangement as claimed in claim 1, wherein said relay means are mounted on a printed circuit card affixed to the bottom of said keypad and extending in a plane substantially parallel thereto.

4. An arrangement for selectively connecting, by means of a keypad of n keys, an electrical potential to a group of control conductors in binary code, said keypad being of the type having a first-coordinate set of control contacts each operatively linked to a first-coordinate set of keys and a second-coordinate set of control contacts each operatively linked to a second-coordinate set of keys of said keypad so that upon depression of one of the keys both the respective first-coordinate control contact and the respective second-coordinate control contact are operated, said arrangement comprising a plurality of relay means and a plurality of feedback preventing rectifying means, each of said relay means having a number of contact means and having an operate winding connected to a respective one of said first-coordinate control contacts so as to be controlled thereby, said contact means being connected in a pattern of tree-type structure having n outputs and a lesser number of inputs, said inputs being connected, in series with respective ones of said second-coordinate set of control contacts, to said electrical potential so that said potential is passed to a selected one of said n outputs, and said rectifying means being connected, in a conductive direction, on their input sides to one or more of the outputs of said pattern and on their output sides combinationally to said group of control conductors.

5. An arrangement as claimed in claim 4, wherein said relay means and said rectifying means are mounted on a printed circuit card affixed to the bottom of said keypad and extending in a plane substantially parallel thereto.

6. An arrangement for connecting an electrical potential to a selected one of ten circuit points by means of a keypad having at least 10 keys, said keypad being of the type having a first set of three control contacts each operatively linked to a column of said keys and a second set of four control contacts each operatively linked to a row of said keys, and also having a common contact, such that, upon depression of any one of the keys, the respective control contacts of said first and second sets and, subsequently also said common contact are operated, said arrangement comprising two relatively fast operating relays each having a number of relay contacts and having an operating winding individually connected to a control contact of said first set so as to be controlled thereby, said relay contacts being connected in a pattern of tree-type structure having n outputs and a lesser number of inputs, said inputs being connected, in series with respective ones of said second set of control contacts, and with said common contact, to said electrical potential so that said potential is passed to the selected one of said ten circuit points.

* * * * *